S. W. FARNHAM & F. W. OLIN.
METHOD OF AND APPARATUS FOR MEASURING THE STRINGING OF SHOT.
APPLICATION FILED AUG. 10, 1914.

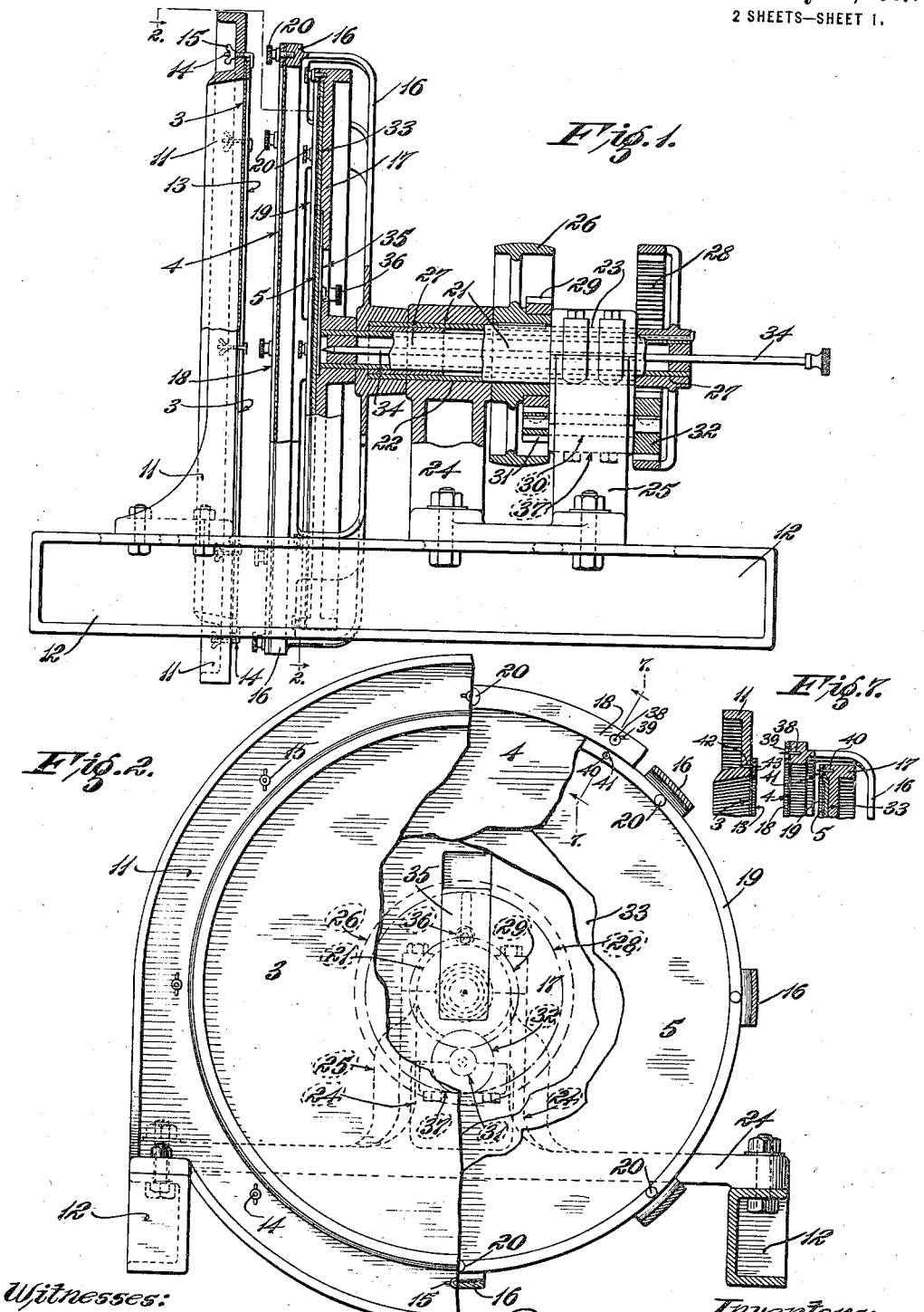

1,226,762.

Patented May 22, 1917.
2 SHEETS—SHEET 2.

UNITED STATES PATENT OFFICE.

SIDNEY W. FARNHAM, OF CHICAGO, AND FRANKLIN W. OLIN, OF ALTON, ILLINOIS, ASSIGNORS TO WESTERN CARTRIDGE COMPANY, OF EAST ALTON, ILLINOIS, A CORPORATION OF NEW JERSEY.

METHOD OF AND APPARATUS FOR MEASURING THE STRINGING OF SHOT.

1,226,762.   Specification of Letters Patent.   Patented May 22, 1917.

Application filed August 10, 1914. Serial No. 856,103.

*To all whom it may concern:*

Be it known that we, SIDNEY W. FARNHAM, a citizen of the United States, and a resident of the city of Chicago, in the county of Cook and State of Illinois, and FRANKLIN W. OLIN, a citizen of the United States, and a resident of the city of Alton, in the county of Madison and State of Illinois, have invented a new and useful Improvement in Methods of and Apparatus for Measuring the Stringing of Shot, of which the following is a specification.

This invention relates to the proving or testing of shot guns or fowling pieces and fixed ammunition or shells such as are used for sporting purposes, and consists in methods of and means for determining the distribution or grouping of the shot in a load at a predetermined distance from the muzzle of the gun. It is well known that a load of shot discharged from an ordinary fowling piece scatters after leaving the muzzle, and it is the aim of gunmakers and shell makers to regulate the scattering of the shot and to cause it to be uniformly distributed with respect to planes transverse to its trajectory at successive points along its line of flight. The scattering transverse to the line of flight may be observed by placing a paper target across the trajectory at the desired point and noting the position of the holes perforated by the respective shot; but the scattering of the shot behind one another along the line of flight, or "stringing," cannot be observed by this method. The object of this invention is the determination of both the transverse distribution, or scattering, and longitudinal distribution, or stringing, of the shot in a load at a predetermined distance from the muzzle of the gun.

The form of apparatus devised by us for accomplishing this object consists essentially of one stationary and one or more moving targets, at and through which the load of shot is fired. In order that the velocity of the shot may not be affected by its passage through the targets, and to avoid deflecting the shot from their straight line paths, the targets should be of uniform material easily pierced by the shot, such as paper. The first target is stationary and is clamped around its circumference on a suitable frame. The second target is mounted for movement across the path of the shot at a short distance behind the first one, by means of a supporting device which will maintain the second target in a plane parallel to the first at whatever velocity it may be moving. Behind the second target there may be located a third paper target, arranged for movement in a direction either the same as or different from the second one, and at the same speed as or at a different speed from the second one. This third target is useful for the determination of the linear velocity of the shot, and is of assistance in the identification of the respective pellets in the load, as hereinafter explained. The moving targets may be strips or bands of paper moving in straight or curved lines transverse to the path of the shot, or they may be paper disks rotating about their centers directly in the path of the shot.

If rotating targets be used, as in the apparatus described herein, the angular velocity thereof should be sufficiently low so that the angle traversed between the times of penetration of the first and last pellets in any charge of shot will not exceed one hundred and eighty degrees. The identification of the respective pellets in a load or charge can be made more conveniently if the speed is reduced to such a speed that the greatest angle traversed by the targets between the times of penetration of the first and last pellets will not exceed 15 or 20 degrees. Knowing the angular velocity of the rotating target or targets, by observing the angles traversed by such target or targets between the times of penetration of the respective pellets 90 their distances apart, measured in fractional parts of a second, along the line of flight may be determined by a simple arithmetical calculation, as hereinafter described.

If it is also desired to find the distances apart measured in feet of the respective pellets along the line of flight the speed of each pellet in feet per second must be determined, and this may be done by observing the angle traversed by the second rotating target during the passage of each pellet across the space intervening between the two rotating targets, as hereinafter described. However, as the average velocity of the load of shot at any given distance from the gun may be readily approximated by the use of well known formulas based upon the muzzle velocity, which in turn may be determined for each charge by means of the chronograph, we may dispense with the third rotating target and calculate the distances apart of the respective pellets, in feet along the line of flight by multiplying their distances apart in seconds by this approximate velocity in feet per second. In the cases of extreme pellets, that is, those very far ahead of or behind the average shot, their actual velocities will vary appreciably from the average velocity of the shot, and therefore, the velocities of these pellets should be determined by our improved method.

Further details of our invention appear in connection with the description of the apparatus for carrying it out illustrated in the accompanying drawings; and in what our invention consists is particularly pointed out in the appended claims.

In the drawings, in which like characters designate like parts wherever they occur, Figure 1 is a side elevation of the apparatus, partly broken away to show the upper portion in section on a vertical central plane;

Fig. 2 is a half front elevation, and half section on the line 2—2 in Fig. 1; the targets and cardboard backing being partly broken away to disclose the parts beneath;

Figs. 3, 4 and 5 are front views of the three paper targets after a load of shot has passed through;

Figure 3:
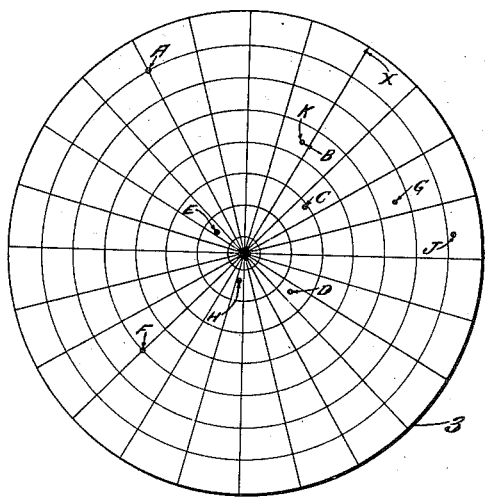
Figure 4:
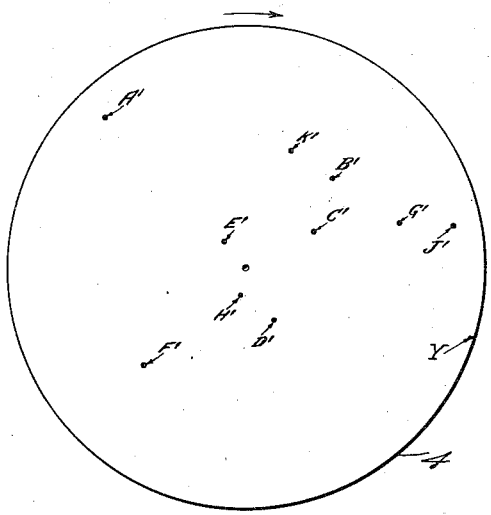
Figure 5:
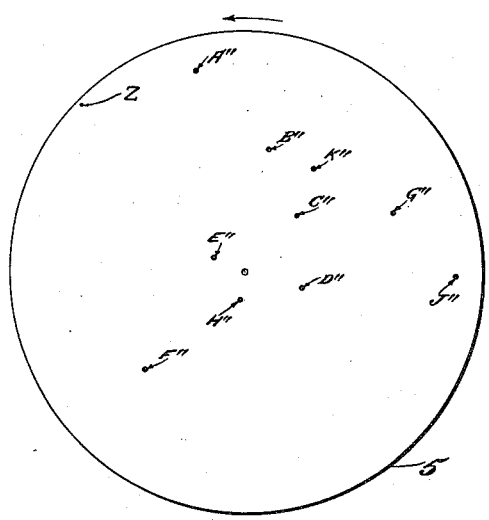
Figure 6:
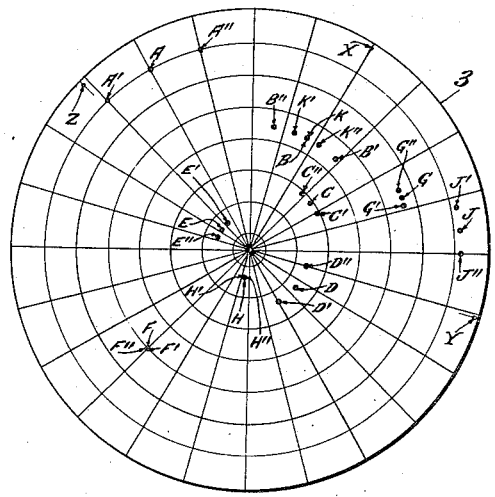

Fig. 6 is a view of the target shown in Fig. 3 upon which the points at which the respective shot passed through the targets shown in Figs. 4 and 5 have been traced, the two last mentioned targets being superposed on the first in their respective instantaneous angular positions at the times a selected shot passed through them; and Fig. 7 is a part cross-section through the supporting members for the targets on the line 7—7 in Fig. 2, showing the index needle points in side view.

Referring to the drawings, the apparatus comprises a stationary annular frame 11 mounted between the front ends of the side frames 12 to which it is bolted. A circular paper target 3 is clamped to this stationary frame around its circumference by a ring 13 secured by bolts 14 and wing nuts 15 or other suitable clamping means. To the rear of the stationary target 3 are mounted one behind the other two circular paper targets, 4, 5, clamped around their circumferences to an annular frame 16 and disk 17 respectively, by means of rings, 18, 19, secured by thumb screws 20 or other suitable means. The frame and disk are concentric, and are mounted for rotation about the same axis.

The frame 16 is fixed on the front end of a hollow shaft 21 journaled in bearings 22, 23 in pedestals 24, 25 on a plate bolted to the side frames behind the targets. The shaft 21 has keyed to it a driving pulley 26 to be belted to an electric motor or other source of power. The disk 17 is supported on the front end of a hollow shaft 27 mounted for rotation within and projecting beyond the ends of the shaft 21, and driven by an annular gear 28 fixed upon its rear projecting end. The annular gear 28 is driven from the pulley 26 by means of a spur gear 29 fixed on the hub of the pulley and a short shaft 30 mounted in a block 37 in the pedestal 25 and carrying on its ends spur gears 31, 32 meshing with the spur gear 29 and annular gear 28 respectively. The sizes and arrangements of these gears is such that the shaft 27 is rotated at the same speed as and in the direction opposite to the shaft 21, thus causing the targets 3, 4, carried by the shafts to be rotated at the same speed and in opposite directions. It is evident that the sizes and arrangement of the gears may be such that the targets are rotated at different speeds in the same or in opposite directions if desired.

Between the target 5 and disk 17 is a layer of cardboard 33 or other soft material in which the shot embed themselves and are retained after passing through the targets. Axially mounted within the hollow shaft 27 is a centering needle 34 for pricking the centers of the rotating paper targets and for locating the center of the stationary target concentric with respect to the rotating targets. A slide 35, moved and locked in place by a thumb screw 36, covers the open end of the shaft 27 at all times except when the centering needle is being used.

At a convenient point on the edge of the frame 11 against which the target 3 is clamped is fixed an index needle point 42 projecting through the target into a hole 43 in the clamping ring 13. Similar index needle points 38, 40 are fixed in the edges of the rotating frame 16 and disk 17 to project through the targets 4, 5 into holes in the clamping rings 18, 19. The index needle points are so located with respect to each other than when the index 38 in the rotating frame is in the same diametral plane with the index 42 in the stationary frame the index 40 is also in the same diametral plane therewith.

The space between the annular frame 11 and the rotating frame 16 may be varied by sliding either the frame 11 or plate carrying the pedestals 24, 25 along the side frames, and this space should be adjusted so that the "wind" of the shot and the air suction due to the centrifugal effect of the rotating targets will have a minimum effect on the rotating target 4. Dishing of the target 3 and variations in the distance between the targets 3 and 4 have no effect on the average angular distance rotated through by the rotating targets, as hereinafter explained, but the targets 4 and 5 must be kept flat in their planes of rotation with the distance between them constant, in order to attain a high decree of accuracy in the results which it is the object of our invention to accomplish.

The target 3 (see Fig. 3) is marked with concentric circles and with radial lines at uniform angular distances apart for convenience in operating the apparatus, as will be fully explained hereinafter. The targets 4 and 5 may be marked with circles and radial lines similarly to the target 3, or they may be left plain. The target 4 is not essential, and may be omitted in the operation of the apparatus, but we prefer to use it in order to obtain a check upon the accuracy of the observations made with the targets 3 and 5.

In the operation of the apparatus the plain paper targets 5 and 4 are stretched upon the disk 17 and frame 16 respectively, and securely clamped, the driving power being thrown off the machine leaving the rotating parts free to revolve as may be required during this operation. The holes where the index points 38, 40, pierce the targets should be plainly designated. The target 3, marked with radial lines and concentric circles, is next stretched upon the stationary frame 11, care being taken to adjust it so that its center is in line with the axis of the centering needle 34, which may be thrust through the targets 4 and 5 in order to bring its point into the proximity with the target 3, and care also being taken that the index point 42 passes through a radial line. If targets 4 and 5 are marked like target 3 care must be taken that their centers coincide with the axis of the centering needle. In either case, the centers of targets 4 and 5 must be pricked by the centering needle before they are unclamped. After the centering needle is withdrawn the plate 35 is slid over the opening in the center of the disk 17 and clamped by the thumb-screw 36. The driving power is then thrown on and the targets 4 and 5 set in rotation. We find 200 revolutions per minute a convenient speed at which to rotate the targets. This speed corresponds to an angular velocity of 1200 degrees per second; that is, one degree of rotation requires a time interval of $\frac{1}{1200}$ seconds.

Next, a charge or load of shot is fired at the targets on a direct line with their centers. The shot penetrate the stationary and moving targets almost simultaneously, but some pellets of shot will strike earlier and some later than the average shot. The targets are then removed from the frames, and by the assistance of the concentric circles certain isolated holes can be identified as being caused by the same pellet on each of the three targets. The holes bearing the same letters in Figs. 3, 4 and 5 are those made by the same pellets, respectively. In any pattern it is possible to find a pellet hole having a radial distance from the center of the target different from that of any other pellet holes. This feature, together with the similarity of the pattern on all three targets, especially noticeable near the center where the amount of distortion of the patterns on the moving targets as compared with the stationary one is slight, will make this identification certain. When the mark of some one individual pellet has been absolutely identified on both the rotating and the stationary targets, then one of the rotating targets is placed over the stationary one with their centers coincident, and with the points of penetration of this particular pellet coincident on both targets. By means of a suitable marker the points of penetration of the other pellets on the rotating target and the hole made by the index point are marked through on the stationary target. Similarly the second rotating target next is placed upon the stationary target with the holes made by the same reference pellet coinciding, and the points where the pellets penetrated the rotating target and the hole made by the index point are spotted on the stationary target with marks colored so as to distinguish the pattern thus made from that made from the first rotating target.

On removing the rotating target and observing the patterns traced on the stationary one it will be found that for every hole made by a pellet penetrating the stationary target there will be two marks adjacent thereto on a circle concentric therewith, corresponding to the holes made by the same pellet in the rotating targets; these marks or traces will be about equi-distant from the pellet hole and should be exactly so if the three paper targets could be entirely prevented from vibrating, and if the pellets all traveled in parallel paths. The third target is useful in positively identifying the holes made by the respective pellets, even when it is not used in determining the velocities of the pellets, by reason of the fact that when several pellets passed through the targets close together and at about the same radial distances from the center it would be impossible to identify their traces from one rotating target alone; but by pairing each trace from one rotating target with a trace from the other rotating target at the same distance on the opposite side of a pellet hole, it may be determined with certainty which traces and holes correspond to the several pellets. Fig. 6 shows the target 3 after the holes made by the shot in targets 4 and 5 have been traced thereon, the pellet F being selected as the reference pellet.

In Figs. 3 and 6 the holes made in the targets by the same pellets are indicated by the letters A, B, C, D, E, F, G, H, J and K, respectively. In Figs. 4 and 5 the holes, and in Fig. 6 the traces of the holes in targets 4 and 5, are indicated by the same letters with prime and double prime marks added to indicate which target they were made in or traced from, the primed letters indicating holes or traces of holes made by the respective shot or pellets in target 4 and the double primed letters indicating holes or traces of holes made by the same pellets in target 5. Some of the pellets penetrated the targets earlier and some later than the reference pellet F above referred to, and the approximate order or sequence of the pellets can be readily distinguished on the patterns thus made by noting whether the marks traced on the stationary target from the moving targets can be described as ahead of or behind, having reference to the direction of rotation of the rotating target, the actual points of penetration of the stationary target by the same pellet. The respective directions of rotation of the targets 4 and 5 are indicated by the arrows in Figs. 4 and 5. Those pellets that penetrated the targets at the same instant the reference pellet did will have their marks or traces coincident with the points where they penetrated the stationary target. Thus, referring to Fig. 6, it is evident that the pellet H penetrated the targets at the same instant with the pellet F, and that the pellets B, C, D, E and G penetrated earlier and the pellets A, J and K penetrated later. The pellet K passed through the same hole in the stationary target as the pellet B, but at a later instant.

The angular distance between the hole made by a pellet in the stationary target and its trace thereon measures the number of degrees through which the corresponding rotating target revolved between the instant of penetration thereof of that pellet and the instant of penetration of the reference pellet, and therefore, said angular distance is proportional to the time interval between the instants of penetration of said pellet and the reference pellet. There will be a slight variation in the angles between the respective holes and their traces from the two rotating targets, due to the vibration of the paper targets, but error from this cause is largely compensated for by taking the average of the angular distances of the two traces from each pellet hole. By measuring the angles between the lines drawn to the center from the two traces on the stationary target indicating the holes made by a pellet in the moving targets, and then dividing by two, the average angular distance or displacement in degrees for that pellet is found.

The average angular displacement of a pellet in degrees divided by the angular velocity of the rotating targets in degrees per second equals the time interval in seconds between the instant of penetration of said pellet and the instant of penetration of the reference pellet.

The distances in feet measured along the line of flight between the respective pellets and the reference pellet are equal to the velocities of the respective pellets in feet per second multiplied by the time intervals in seconds between their respective instants of penetration and the instant of penetration of the reference pellet.

The velocities of the respective pellets in feet per second may be computed separately for each pellet by observing the angle traversed by the target 5 while the pellet was crossing the space between the targets 4 and 5. Assuming that, in the apparatus herein described, the space between the targets 4 and 5 is 5 inches, and the target 3 is 5 feet 3 inches in diameter, then an angle of one degree will measure upon the circumference of the target $\frac{11}{20}$ inches. Measuring the length of the arcs of the circumference between the reference points X and Y and X and Z we find that the reference point Z is $\frac{1}{4}$ inch farther removed from the reference point X than is the reference point Y, corresponding to an angle of $\frac{1}{4}$ divided by $\frac{11}{20}$, or $\frac{5}{11}$ degrees, rotated through by the target 5 while the pellet F was crossing the space between the targets 4 and 5. At 200 revolutions per minute the time interval required for the target 5 to rotate $\frac{5}{11}$ degrees is found by dividing the number of degrees by 1200 (each degree of rotation requires a time interval of $\frac{1}{1200}$ seconds, as explained above) and therefore $\frac{5}{11}$ degrees corresponds to a time interval of $\frac{5}{11} \times \frac{1}{1200}$ or $\frac{1}{2640}$ seconds. To have crossed the space between targets 4 and 5 in $\frac{1}{2640}$ seconds the pellet F must have had a velocity of $\frac{5}{12}$ feet divided by $\frac{1}{2640}$ seconds, or 1100 feet per second. This velocity may be assumed to be the average velocity of the pellets.

The distance in feet measured along the line of flight between any pellet and the reference pellet can be approximately calculated, knowing the average velocity of the shot, by multiplying its angular displacement in degrees, by its average velocity in feet per second and dividing by twelve hundred, where the targets were rotated at two hundred revolutions per minute. When the rotating targets have other speeds than two hundred revolutions per minute (corresponding to an angular velocity of 1200 degrees per second), the number to be used as a divisor should correspond thereto. Taking the pellet A, for example, the average angular displacement (see Fig. 6) is fifteen degrees. If the targets were rotated at two hundred revolutions per minute, and the average linear velocity of the shot was eleven hundred feet per second, then the pellet A was about $\frac{15 \times 1100}{1200}$ or 13 3/4 feet behind the reference pellet F. In the same way, the pellet B is found to have been about $\frac{17\ 1/2 \times 1100}{1200}$ or 16 1/24 feet ahead of the reference pellet F.

Applying the method used for determining the velocity in feet per second of the pellet F to the pellet A we first observe that when the rotating targets are superposed on the stationary target, the reference point Z is $\frac{11}{40}$ inches farther removed from the reference point X than is the reference point Y, corresponding to an angle of 1/2 degrees rotated through by the target 5 while pellet A was crossing the space between the targets 4 and 5. The time interval corresponding to 1/2 degree is $\frac{1}{2400}$ seconds, and therefore the actual velocity of the pellet A was $\frac{5}{12}$ feet divided by $\frac{1}{2400}$ seconds, which is 1000 feet per second, and the pellet was actually $\frac{15 \times 1000}{1200}$ or 12 1/2 feet behind the reference pellet F. In the same way we find the actual velocity of the reference pellet B by observing that when the rotating targets are superposed on the stationary target the reference point Z is 9/40 inches farther removed from the reference point X than is the reference point Y, corresponding to an angle of 9/22 degrees rotated through by the target 5 while pellet B was crossing the space between the targets 4 and 5. Applying the same method as before we find the actual velocity of the pellet B to have been $\frac{5}{12}$ feet divided by $\frac{1}{1200} \times \frac{9}{22}$ seconds, or 1222 2/9 feet per second, and the pellet was actually $\frac{17\ 1/2 \times 1222\ 2/9}{1200}$ or slightly over 17 1/2 feet ahead of the pellet F.

By calculating the position of each pellet separately the stringing of the shot comprising the load fired through the targets at the range selected may be determined, and thus the perfection of the gun or shell under test may be observed.

Although we have described with particularity a preferred form of apparatus for carrying out the invention, the invention is not restricted to this apparatus.

What we claim as our invention is as follows:

1. The method of determining the stringing of a load of shot when discharged which consists in causing each shot to pass through a stationary target and a target moving at a known speed, and measuring the time intervals between successive shot by the respective distances through which the moving target moves during the intervals between the passage of said successive shot.

2. The method of determining the stringing of a load of shot when discharged which consists in causing each shot to pass through a stationary target and two targets moving at known velocities in opposite directions, and measuring the time intervals between successive shot by the average of the two distances through which the moving targets move respectively during each interval between the passage of said successive shot.

3. The method of determining the stringing of a load of shot when discharged which consists in causing each shot to pass through two targets spaced apart and moving in opposite directions at the same velocity, ascertaining the velocity of said targets, measuring the relative movement of said moving targets in the interval between the instants of passage of said shot through said targets respectively, and calculating the time interval required for each shot to cross the space between said targets from said velocities and measurements.

4. The method of determining the stringing of a load of shot when discharged which consists in causing each shot to pass through a stationary target and two targets moving in opposite directions at known velocities, and measuring the time intervals between successive shot by the average of the two distances through which the moving targets move respectively during each interval between the passage of said successive shot, and the linear velocity of each shot by measuring the distance through which the second moving target moves during the passage of said shot across the space between the moving targets, whereby the linear spaces between successive shot in the load may be computed.

5. In apparatus of the character described, a stationary target and a moving target arranged in alinement, one of said targets being made of a material easily pierced by shot, means for identifying the holes made by the respective pellets on each of said targets, and means for maintaining a constant velocity for said moving target during the passage of a load of shot.

6. In apparatus of the character described, the combination of a stationary target and two targets moving in synchronism in opposite directions in parallel planes adjacent to said stationary target, and means for maintaining the synchronous movement of said moving targets during the passage of a load of shot through them.

7. In apparatus of the character described, the combination of a stationary target and two targets moving in synchronism in different directions in planes substantially parallel to said stationary target, and means for maintaining the synchronous movement of said moving targets during the passage of a load of shot.

8. In apparatus of the character described, a stationary target and a moving target arranged in alinement, one of said targets being made of a material easily pierced by shot, means for maintaining the movement of said moving target during the passage of a load of shot, and means for ascertaining the velocity of the moving target.

9. In apparatus of the character described, the combination of two targets moving in synchronism in different directions in parallel planes, one of said targets being made of a material easily pierced by shot, means for determining the relative positions of said targets at any instant, and means for maintaining the synchronous movement of said targets during the passage of a load of shot.

Signed at Chicago, Ills., this 27th day of July, 1914.

SIDNEY W. FARNHAM.

Witnesses to the signature of S. W. Farnham:

FRED H. JOHNSTON,
FRANCIS L. LaRUE.

Signed at St. Louis, Mo., this 5th day of August, 1914.

FRANKLIN W. OLIN.

Witnesses to the signature of F. W. Olin:

J. M. OLIN,
M. A. SHELTON.